United States Patent [19]

Maeda et al.

[11] Patent Number: 4,722,535
[45] Date of Patent: Feb. 2, 1988

[54] OIL RING STRUCTURE HAVING REDUCED RIGIDITY

[75] Inventors: Yorishige Maeda, Toyota; Yoshiaki Wada, Niigata; Shizuo Shinada; Sumio Ono, both of Kashiwazaki, all of Japan

[73] Assignees: Toyota Jidosha Kabushiki Kaisha, Aichi; Kabushiki Kaisha Riken, Tokyo, both of Japan

[21] Appl. No.: 818,139

[22] Filed: Jan. 13, 1986

[30] Foreign Application Priority Data

Jan. 16, 1985 [JP] Japan .................... 60-4146

[51] Int. Cl.$^4$ .................................. F16J 9/06
[52] U.S. Cl. .................... 277/139; 267/1.5; 277/140; 277/215
[58] Field of Search ............. 277/139, 140, 141, 215, 277/201; 267/1.5

[56] References Cited

U.S. PATENT DOCUMENTS

| | | | |
|---|---|---|---|
| 2,250,062 | 7/1941 | Hellman | 277/141 |
| 2,877,072 | 3/1959 | Pien | 277/139 |
| 3,051,499 | 8/1962 | Minegishi | 277/140 |
| 3,261,612 | 7/1966 | Games | 277/139 X |
| 3,580,589 | 5/1971 | Prasse et al. | 277/140 |
| 4,468,040 | 8/1984 | Plant | 277/140 |

FOREIGN PATENT DOCUMENTS

| | | | |
|---|---|---|---|
| 1029205 | 4/1958 | Fed. Rep. of Germany | 277/139 |
| 57-38956 | 3/1982 | Japan . | |
| 59-107952 | 7/1984 | Japan . | |
| 60-88164 | 6/1985 | Japan . | |
| 773268 | 4/1957 | United Kingdom | 277/140 |
| 810247 | 3/1959 | United Kingdom | 277/139 |

*Primary Examiner*—Allan N. Shoap
*Attorney, Agent, or Firm*—Parkhurst & Oliff

[57] ABSTRACT

An oil-ring comprising a pair of side rails and an expander disposed between the side rails. The expander extends in a circumferential direction and has waves in a radial direction. At both sides of radially inner portions of the expander, side rail engaging portions protrude in an axial direction. The side rail engaging portions are formed as paired side rail engaging sections within one pitch of the waves, by defining a slit extending in the axial direction at a central portion of one side rail engaging portion. Due to the division from one side rail engaging portion to paired side rail engaging sections, the rigidity of each side rail engaging portion can be weakened appropriately, and each side rail can follow against the cylinder bore surface satisfactorily, thereby decreasing oil consumption.

5 Claims, 8 Drawing Figures

OIL RING STRUCTURE HAVING REDUCED RIGIDITY

BACKGROUND OF THE INVENTION

1. Field of the Invention

The present invention relates to an oil-ring for disposition in an oil-ring groove of a piston of an internal combustion engine. More specifically, the invention relates to a three-piece oil-ring consisting of a pair of side rails and an expander provided between the paired side rails.

2. Description of the Prior Art

Three-piece oil-rings have been known including a pair of side rails separated by an expander extending in a circumferential direction with waves in a radial direction. Both ends of the expander are opposed to each other. In this expander, side rail engaging portions of the expander are formed on both sides, axially, of radially inner portions of the expander so as to protrude in an axial direciton. The side rail engaging portions are engaged with inside surfaces of the pair of side rails, thereby transmitting the expanding spring force of the expander to the paired side rails, pushing the paired side rails slidably against a cylinder bore surface.

In the composite oil-ring including the above-mentioned radially waving expander, for the purpose of contacting the paired side rails to the cylinder bore surface during reciprocal motion of a piston, the side rail engaging portions of the expander must move along the cylinder bore surface in a radial direction. However, since the expander itself has rigidity, the side rail engaging portions formed on opposite sides of flat portions at the radially inner portions of the expander cause each other to deform. Also, typical cylinder bores do not have perfectly straight axial walls, thereby causing a piston slap during the receiprocal motion thereof. Therefore, one of the paired side rails may contact the cylinder bore surface while the other one does not. The result is an increase in oil consumption.

Since this problem arises due to the fact that the side rail engaging portion at one side of the expander is deformed by the opposite side rail engaging portion, various inventions to reduce rigidity or increase flexiblity of the expander have been proposed. For example, Japanese Utility Model Publication No. SHO 57-38956 disclosed a composite oil-ring, wherein spring arms extend from both upper and lower portions of an expander, tip portions of the arms contact an inside surface of a rail ring and a center portion of the rail ring is supported by a waving portion of the expander.

In the above composite oil-ring, since a rail engaging portion has very low rigidity, the rail engaging portion at one side of the expander receives little deforming influence from the opposite rail engaging portion. However, since the rail engaging portion extends for a relatively long distance, it is difficult to form the rail engaing portion in a planned shape. Also, if the rigidity of the rail engaging portion is too low, fluttering due to a resonant phenomenon may happen at high engine speeds, causing an increase in oil consumption.

Another Japanese Utility Model Publication No. SHO 59-107952 discloses a composite oil-ring, wherein a pair of side rails themselves are formed with low rigidity. However, by only weakening the rigidity of the paired side rails, reliable following of the paired side rails along a cylinder bore surface in a case of large fluctuation in a clearance between a piston and the cylinder bore surface may not be obtained.

OBJECTS AND SUMMRY OF THE INVENTION

An object of the present invention is to provide a three-piece oil-ring including a pair of side rails and an expander disposed between the paired side rails, wherein a side rail engaging portion at one side of an expander receives little deforming influence from a side rail engaging portion at opposite side of the expander due to a weakening of the rigidity of the side rail engaging portions. As a result, each one of the paired side rails can follow a cylinder bore surface at time of engine operation independently from the other side rail and each one of the paired side rails can follow the cylinder bore surface even under any condition of an engine or any accuracy of straightness of a cylinder bore.

The oil-ring according to the present invention satisfies the above object and is intended to be disposed in an oil-ring groove formed in a piston which is inserted to move reciprocally in a cylinder. The oil-ring according to the present invention comprises a pair of side rails and an expander disposed between the paired side rails so as to expand the side rails. The expander extends in a circumferential direction and has waves in a radial direction. The expander is provided with side rail engaging portions at axially opposite sides of radially inner portions of said expander. The side rail engaging portions are formed as paired side rail engaging sections within one pitch of the waves of the expander at the axially opposite sides respectively. The paired side rail engaging sections are formed by defining a slit extending in an axial direction at a circumferentially central portion of one side rail engaging portion. The slit has a length which is longer than an axial length of the one side rail engaging portion.

In the above oil-ring, the expander may define an additional or other set of slits extending in the axial direction at both circumferential outer sides of the paired side rail engaging sections.

In the oil-ring thus constructed, since one side rail engaging portion with a general size in the circumferential direction is divided to paired side rail engaging sections by the slit extending in the axial direction, and since the slit is defined more deeply than the height of the one side rail engaging portion, the rigidities of both paired side rail engaging sections at the upper side and the lower side of the expander are reduced individually. As a result, one paired side rail engaging section can move easily in the radial direction without causing a large deforming influence to a body of the expander and to the paired side rail engaging sections at the opposite side of the expander. Therefore, each paired side rail engaging section at the upper and lower sides of the expander can push each side rail independently. The upper side rail and the lower side rail respectively can follow easily against a cylinder bore surface at the time of engine operation, thereby preventing deterioration of oil consumption.

BRIEF DESCRIPTION OF THE DRAWINGS

The above and other objects, features and advantages of the present invention will become apparent and more readily appreciated from the following detailed description of the preferred exemplary embodiments of the invention, taken in conjunction with the accompanying drawings, in which.

DETAILED DESCRIPTION OF THE PREFERRED EMBODIMENTS

Some preferred embodiments of the present invention will be described hereunder referring to the attached drawings.

Figure 1:
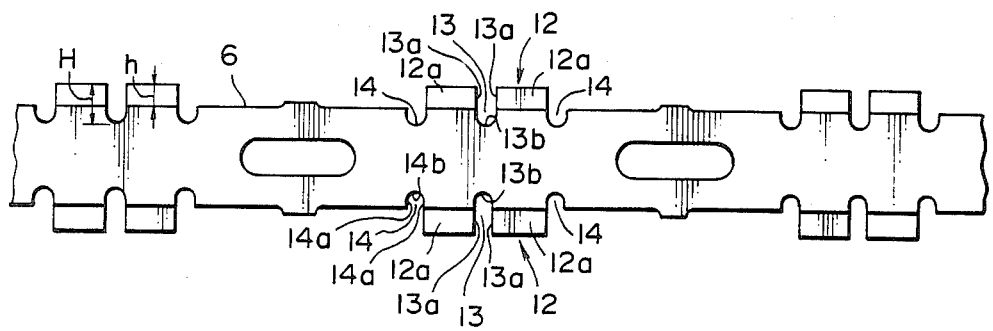
FIG. 1 is a partial elevational view of an expander of an oil-ring according to a first embodiment of the present invention.
Figure 2:
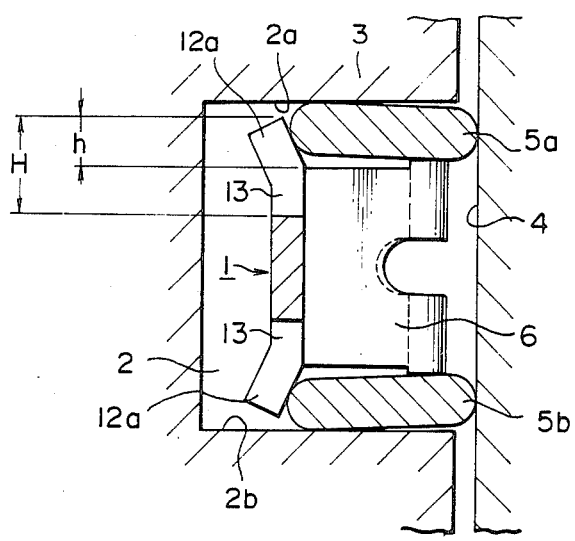
FIG. 2 is a sectional view of the oil-ring and its vicinity according to the first embodiment of the present invention.
Figure 3:
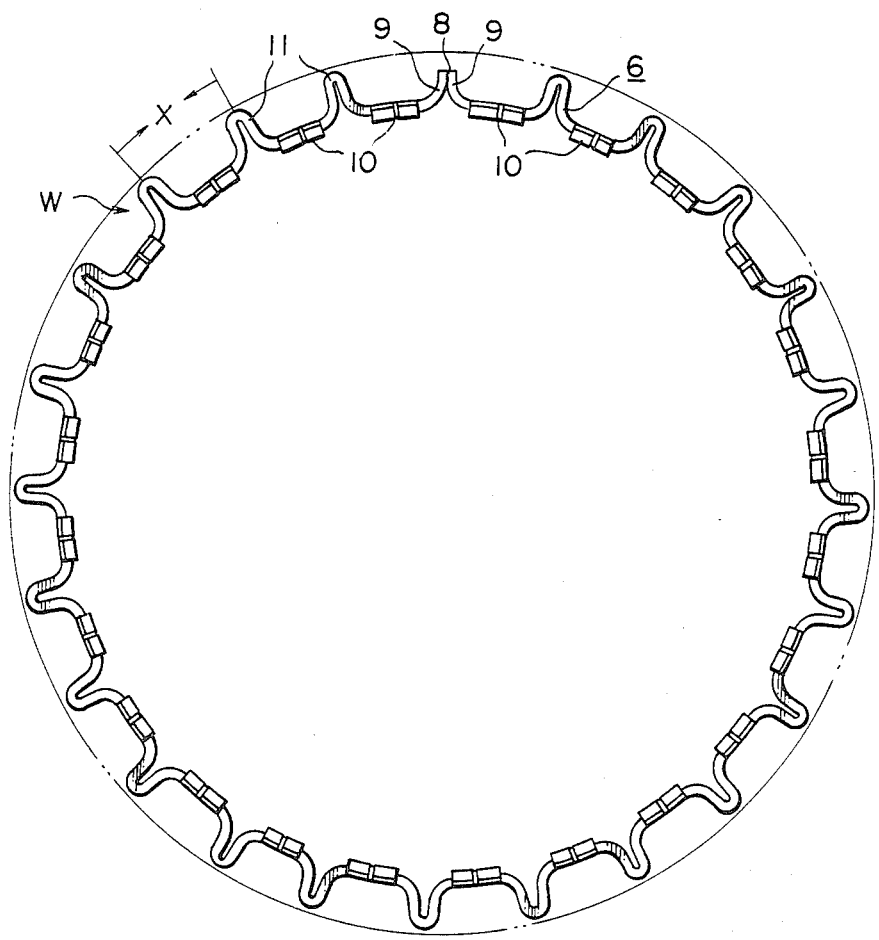
FIG. 3 is an entire plane view of the expander of the oil-ring according to the first embodiment of the present invention.

FIGS. 1 to 5 illustrate an oil-ring according to a first embodiment of the present invention. As shown in FIG. 2, an oil-ring 1 is disposed in an oil-ring groove 2 formed in a piston 3 which is reciprocally positioned in a cylinder 4 of an internal combustion engine.

Oil-ring 1 consists of a pair of side rails 5a, 5b spaced from each other in an axial direciton and an expander 6 disposed between paired side rails 5a, 5b so as to expand side rails 5a, 5b by the spring force of expander 6.

Figure 5:
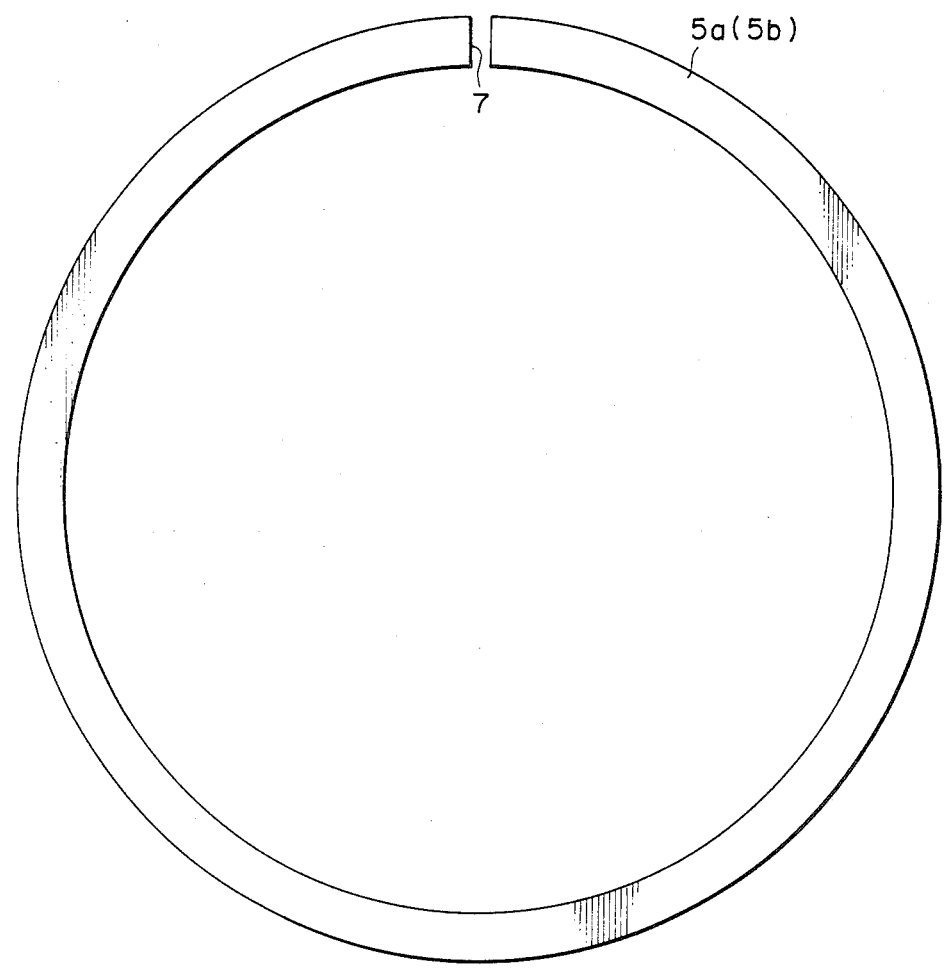
FIG. 5 is a plan view of a side rail of the oil-ring according to the first embodiment of the present invention.

As shown in FIG. 5, side rail 5a, 5b consists of an elastic metallic annular strip abutted at its end. The strip has a gap 7 at the abutted portion.

Figure 4:
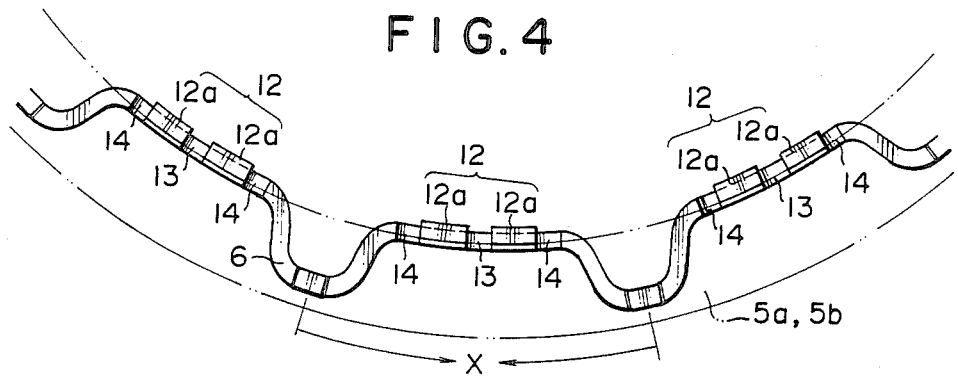
FIG. 4 is a partial plan view of the expander of the oil-ring according to the first embodiment of the present invention.

As shown in FIGS. 1 and 4, expander 6 is constructed of an annular strip abutted at the ends 9, 9 at a postion 8 on its circumference. Expander 6 extends in a circumferential direction and has waves W in a radial direction. A pitch X is defined between the crests of each wave. Expander 8 includes a plurality of flat portions at radially inner portions 10 of the waves and a plurality of curved portions at radially outer portions 11 of the waves. At both axial sides of radially inner portion 10 are integrally formed side rail engaging portions 12, 12 which protrude for an axial length in an axial direction. A radially outside surface of side rail engaging portion 12 contacts a radially inside surface of each side rail 5a, 5b and transmits an expanding force of expander 6 to side rail 5a, 5b.

Side rail engaging portions 12 are formed as paired side rail engaging sections 12a, 12a within one pitch X of the waves W at axially opposite sides respectively. The paired side rail engaging sections 12a, 12a are formed by defining a slit 13 extending in an axial direction at a circumferentially central portion of one side rail engaging portion 12. The axial length H of slit 13 is defined so as to be longer than an axial length h of the one side rail engaging portion 12. Slit 13, also referred to herein as slot 13, is formed as U-shape in shape, i.e., slit or slot 13 has a pair of parallel straight sides 13a, 13a and a curved side 13b connecting the straight sides 13a, 13a at the ends thereof.

In this embodiment, expander 6 includes additional or other slits 14, 14, also referred to herein as slots 14, 14 extending in the axial direction at both circumferential outer sides of paired side rail engaging sections 12a. The other slits or slots 14, 14 are also formed as U-shaped, i.e., slits 14, 14 have a pair of parallel straight sides 14a, 14a and a curved side 14b connecting the straight sides 14a, 14a at the ends thereof. The other slits 14, 14 extend in the axial direction and the length of slits 14 in the axial direction is smaller than the length of slit 13.

Paired side rail engaging sections 12a at both sides of expander 6 in the axial direction are inclined toward the innermost radial direction to urge the paired side raile ngaging sections 12a toward the cylinder bore surface 4. Side rails 5a, 5b transmit the expanding force of expander 6 to cylinder bore surface 4, and at the same time, side rails 5a, 5b transmit a part of the expanding force to an upper surface 2a and a lower surface 2b of oil-ring groove 2.

Next, effects of the oil-ring according to the first embodiment of the present invention will be described.

Since one side rail engaging portion 12 is divided into paired side rail engaging sections 12a, 12a by defining slit 13, the rigidity of paired side rail engaging sections 12a, 12a in the radial direction is reduced compared with the rigidity of one side rail engaging portion 12 in the same direction (i.e., a side rail engaging portion which does not include a slit). Since the length of slit 13 is longer than the length of one side rail engaging portion 12 in the axial direction, paired side rail engaging sections 12a, 12a are connected to a body part of expander 6 with a relatively weak relationship. Also, since the other slits 14, 14 are defined at both outer sides of paired side rail engaging sections 12a, the rigidity of paired side rail engaging sections 12a and the connection between paired side rail engaging sections 12a and the body part of expander 6 are further weakened.

Therefore, each paired side rail engaging portion 12a at both sides of expander 6 in the axial direction deforms easily and independently, and the force which one paired side rail engaging section 12a receives from one side rail 5a may not transmit easily to the opposite paired side rail engaging section 12a. As a result, each side rail 5a, 5b is followed more easily and independently against cylinder bore surface 4 by the spring force of each paired side rail engaging section 12a at both sides of expander 6 in the axial direction.

Since both side rails 5a, 5b may be easily contacted to cylinder bore surface 4, oil adhered on the wall of cylinder bore surface 4 is scraped off more easily, and oil consumption is decreased even in the case of piston slap or deterioration of the straightness of cylinder bore surface 4.

Figure 7:
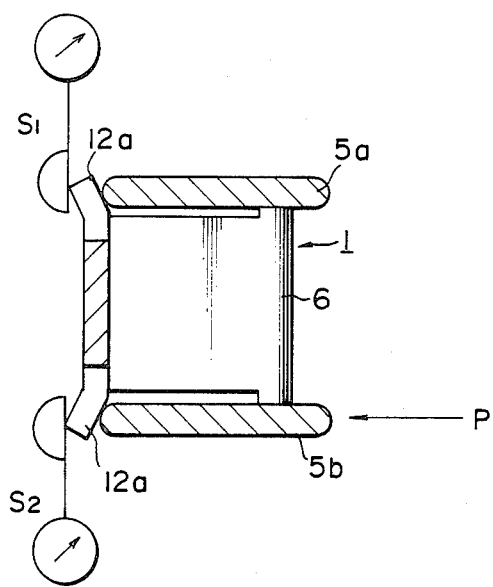
FIG. 7 is a sectional view of the oil-ring according to the first embodiment of the present invention showing a method for measuring a displacement $S_1$ of one of the paired side rails and a displacement $S_2$ of the other of the paired side rails of the first embodiment of the present invention.
Figure 8:
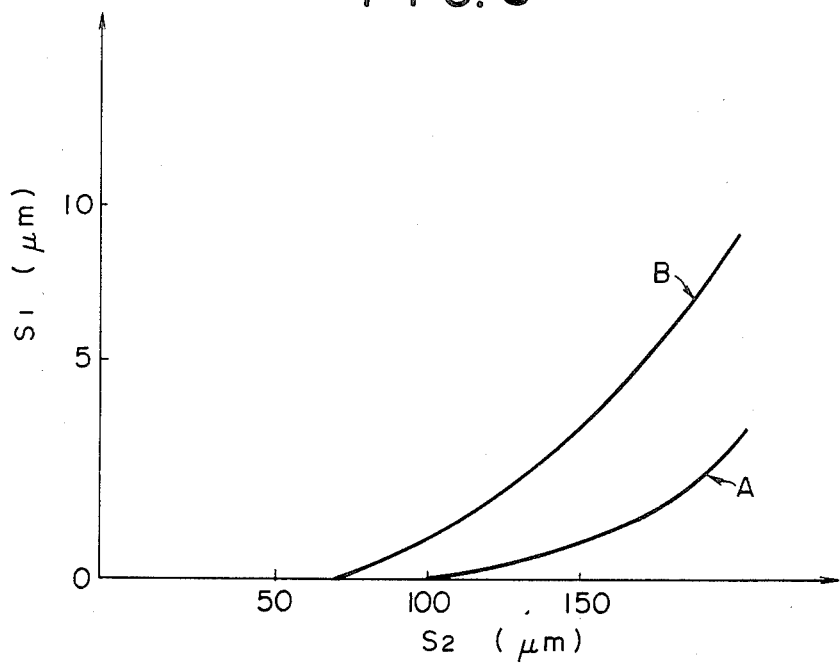
FIG. 8 is a graph showing a relationship between the displacement $S_1$ and the displacement $S_2$ in the measurement of FIG. 7 for the inventive (curve A) and conventional (curve B) oil-rings.

The above effects may also be understood by the following measurement as shown in FIGS. 7 and 8.

FIG. 7 shows the method of the measurement, in the oil-ring 1 on which a normal expanding force P acts. When one of paired side rails 5a, 5b is pushed in a radial direction, the other of paired side rails 5a, 5b will be displaced in the radial direction. $S_2$ is a displacement of paired side rail engaging section 12a at one side of expander 6 in the axial direction to which the force P acts directly via side rail 5b, and $S_1$ is a displacement of paired side rail engaging section 12a at the opposite side of expander 6 to which the force P does not act directly.

FIG. 8 shows a relationship of the radial displacements $S_1$ and $S_2$ in the measurement of FIG. 7 when the force P varies. Curve A represents the displacements of the inventive oil-ring as compared with curve B representing the displacements of a conventional composite oil-ring (not defining a slit).

If an expander and a side rail engaging portion of the expander are rigid completely, $S_1$ will be equal with $S_2$. But, since the expander and the side rail engaging portion are not rigid completely, they are distorted in accordance with the addition of the force P. As shown in FIG. 8, in this embodiment, characteristics A of the displacement $S_1$ of paired side rail engaging section 12a at one side of expander 6 against the displacement $S_2$ of paired side rail engaging section at opposite side of expander 6 is smaller than the characteristics B in the conventional oil-ring. Namely, paired side rail engaging sections 12a and side rail 5a at one side of expander 6 receive little deforming influence from paired side rail engaging section 12a and side rail 5b at opposite side of expander 6. Therefore, both side rails 5a, 5b can follow independently against cylinder bore surface 4, and oil consumption is decreased naturally.

Figure 6:
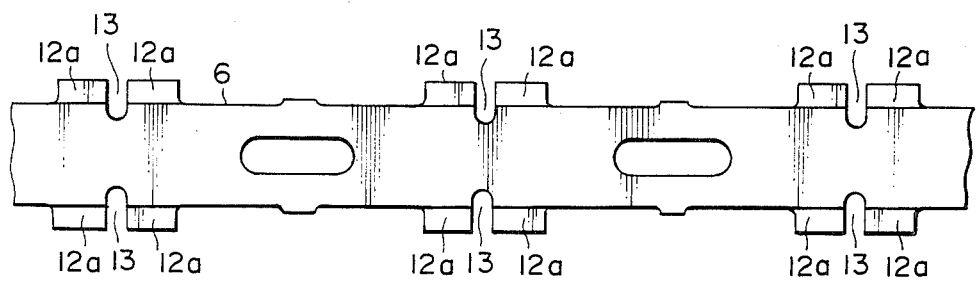
FIG. 6 is a partial elevational view of an expander of an oil-ring according to a second embodiment of the present invention.

Next, FIG. 6 shows a second embodiment of the present invention. The structure of the second embodiment of the present invention is substantially the same as that of the first embodiment of the present invention except that the second embodiment does not include any structure for defining the other slits 14, 14 (FIG. 1). Therefore, in the second embodiment, the description about the same structure as in the first embodiment will be omitted, and the same reference numbers will be employed for the same elements as in the first embodiment.

Thus, merely even by defining only the slit 13, the rigidity of paired side rail engaging section 12a is weakened compared with conventional composite oil-ring, and the performance of the side rails following against cylinder bore surface is improved. Oil consumption is decreased.

Although only several preferred embodiments of the present invention have been described in detail, it will be appreciated by those skilled in the art that various modifications and alterations can be made to the particular embodiments shown without materially departing from the novel teachings and advantages of this invention. Accordingly, it is to be understood that all such modifications and alterations are included within the scope of the invention as defined by the following claims.

What is claimed is:

1. An oil-ring for disposition in an oil-ring groove of a piston reciprocally positioned in a cylinder bore comprising:

a pair of axially spaced side rails, each of said paired side rails having a radially outer side for contacting a wall of said cylinder bore and a radially inner side opposite said outer side and adjacent said groove; and an expander disposed between said side rails to expand said side rails, said expander extending in a circumferential direction and having waves in a radial direction arranged in the circumferential direction and being separated by a spatial pitch, said expander having said rail engaging portions each axially projecting from an edge of said expander for an axial length and each integrally formed at axially opposite sides of radially inner portions of said waves of said expander so as to contact the inner sides of said paired side rails and expand said paired side rails in a radially outward direction, said side rail engaging portions being formed as paired side rail engaging sections within each radially inner portion of said waves at said axially opposite sides respectively, by defining a slot extending in an axial direciton from each edge of said expander at a circumferentially central portion of each side rail engaging portion, said slot having a length longer than the axial length of said each side rail engaging portion to decrease the rigidity of only said side rail engaging portions.

2. The oil-ring as claimed in claim 1, wherein said paired side rail engaging sections extend in an axial direction and are inclined in an inner radial direction.

3. The oil-ring as claimed in claim 1, further comprising additional slots extending in the axial direction at both circumferential outer sides of said paired side rail engaging sections.

4. The oil-ring as claimed in claim 1, wherein said slot is U-shaped, said slot having a pair of parallel straight sides and a curved side connecting said straight sides at the ends theeof.

5. The oil-ring as claimed in claim 3, wherein said additional slots are U-shaped, said additional slots having a pair of parallel straight sides and a curved side connecting said straight sides at the ends thereof.

* * * * *